United States Patent
Mishra

(10) Patent No.: US 11,440,285 B2
(45) Date of Patent: Sep. 13, 2022

(54) METHOD OF QUANTIFYING SURFACE RESIN

(71) Applicant: Bell Textron Inc., Fort Worth, TX (US)

(72) Inventor: Suvankar Mishra, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 312 days.

(21) Appl. No.: 16/866,288

(22) Filed: May 4, 2020

(65) Prior Publication Data

US 2021/0339498 A1 Nov. 4, 2021

(51) Int. Cl.
| | |
|---|---|
| *G01N 5/02* | (2006.01) |
| *B32B 3/30* | (2006.01) |
| *B29B 11/00* | (2006.01) |
| *B29B 11/16* | (2006.01) |

(52) U.S. Cl.
CPC ............... *B32B 3/30* (2013.01); *B29B 11/00* (2013.01); *B29B 11/16* (2013.01); *G01N 5/02* (2013.01); *B32B 2260/023* (2013.01); *B32B 2305/076* (2013.01)

(58) Field of Classification Search
None
See application file for complete search history.

(56) References Cited

U.S. PATENT DOCUMENTS

2013/0169956 A1* 7/2013 Cano Cediel ...... G01N 21/8851
356/237.1

FOREIGN PATENT DOCUMENTS

| CN | 105938076 A | * | 9/2016 |
| EP | 2692783 A1 | * | 5/2014 |
| WO | WO-2016/044415 A1 | * | 3/2016 |

OTHER PUBLICATIONS

Machine Translation of Chinese Patent 105938076, Date Unknown.*

* cited by examiner

*Primary Examiner* — Jeffry H Aftergut
(74) *Attorney, Agent, or Firm* — Shackelford, Bowen, McKinley & Norton, LLP

(57) ABSTRACT

An example of a method of manufacturing a component from a composite prepreg includes collecting a specimen from the composite prepreg and quantifying an amount of surface resin of the specimen by submerging the specimen in a container containing a fluid to determine a fluid pickup percentage. Responsive to a determination that the fluid pickup percentage exceeds a predefined threshold value, forming a component from the composite prepreg.

18 Claims, 4 Drawing Sheets

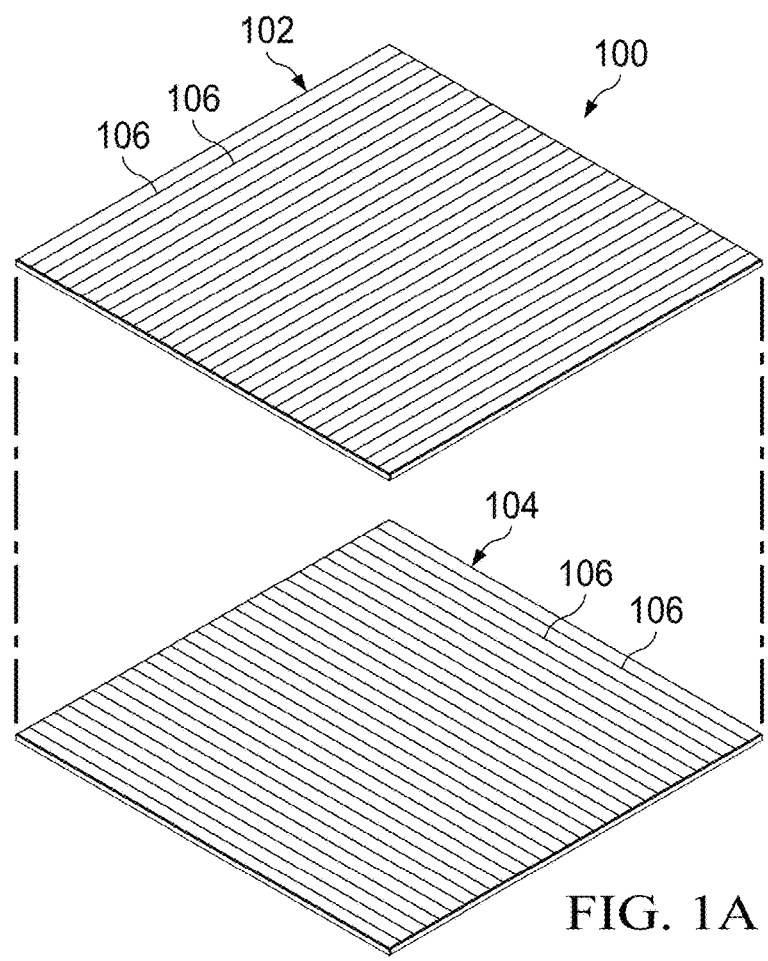
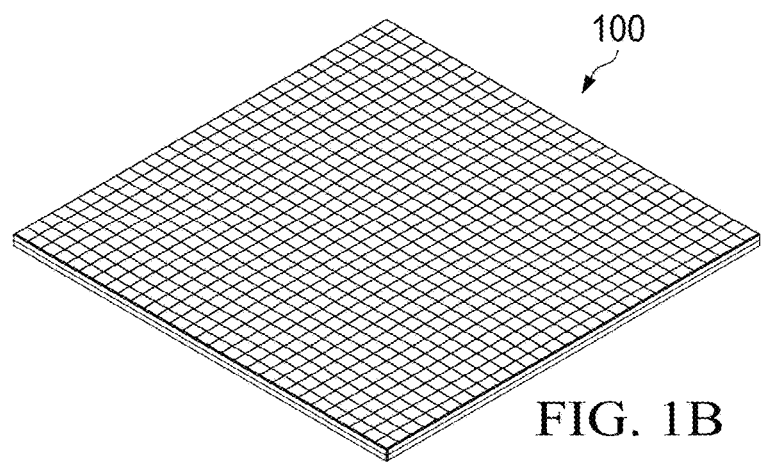
FIG. 1A
FIG. 1B

METHOD OF QUANTIFYING SURFACE RESIN

TECHNICAL FIELD

The present disclosure relates generally to testing composite pre-impregnated fibers ("prepregs") for quality control and more particularly, but not by way of limitation, to quantifying an amount of surface resin present in composite prepregs.

BACKGROUND

This section provides background information to facilitate a better understanding of the various aspects of the disclosure. It should be understood that the statements in this section of this document are to be read in this light, and not as admissions of prior art.

Composite prepregs are used to manufacture a wide variety of components in the aerospace industry. For example, spars are often made of composite prepregs. Manufacturing components from composite prepregs typically includes placing layers of composite prepregs into a mold or tool having the shape of the component being manufacture. Each composite prepreg is made up of layers or plies of composite material that are held together by uncured resin. In addition to holding the layers of composite material together, the uncured resin also provides a stickiness or tackiness that acts as an adhesive to that helps hold the layers of composite prepregs in place during the manufacturing process. After all of the layers of composite prepregs have been positioned, a curing process is used to harden the resin to solidify the layers of composite prepreg. In some instances, the layers of composite prepreg do not adequately bond to each other. Inadequate bonding between the layers of composite prepregs can lead to defects that weaken the component being manufactured. It has been determined that one cause of inadequate bonding is an insufficient amount of tackiness of the composite prepregs.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a method of quantifying surface resin of a composite prepregs includes collecting a first specimen from the composite prepregs, weighing, for a first time, the first specimen to obtain a dry weight of the first specimen, submerging the first specimen in a container containing a fluid, removing the first specimen from the container, weighing, for a second time, the first specimen to obtain a wet weight of the first specimen, calculating a fluid pickup percentage of the first specimen using the dry weight of the first specimen and the wet weight of the first specimen, and comparing the fluid pickup percentage to a predefined threshold value. Responsive to a determination that the fluid pickup percentage is greater than the predefined threshold value, classifying the composite prepreg as usable, and, responsive to a determination that the fluid pickup percentage is less than or equal to the predefined threshold value, classifying the composite prepreg as unusable.

An example of a method of manufacturing a component from a composite prepreg includes collecting a specimen from the composite prepreg and quantifying an amount of surface resin of the specimen by submerging the specimen in a container containing a fluid to determine a fluid pickup percentage. Responsive to a determination that the fluid pickup percentage exceeds a predefined threshold value, forming a component from the composite prepreg.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 1A and 1B are perspective views of a composite prepreg, according to aspects of the disclosure;

DETAILED DESCRIPTION

Figure 2A:
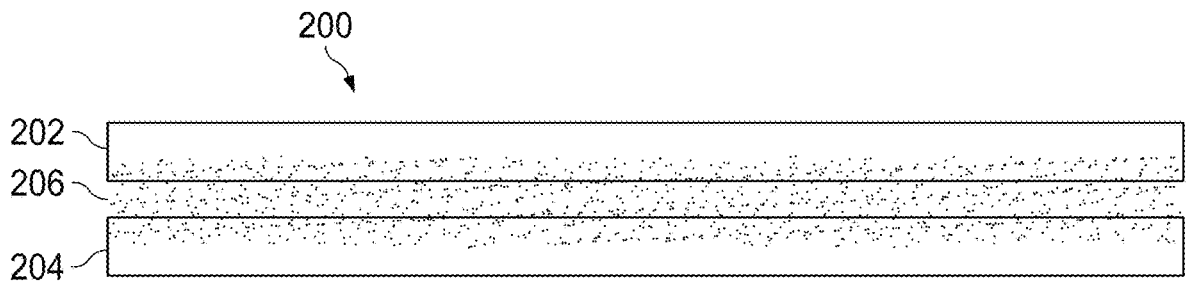
FIGS. 2A and 2B are schematic views of composite prepregs, according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Composite prepregs are commonly used in the aerospace industry to form various parts of an aircraft. For example, fuselages, rotors, and other components of a rotorcraft are frequently made from layers of composite prepregs. FIGS. 1A and 1B illustrate a composite prepreg 100, according to aspects of the disclosure. FIG. 1A illustrates layers or plies 102, 104 of composite prepreg 100 prior to being bonded together, and FIG. 1B illustrates composite prepreg 100 after layers 102, 104 have been joined together via resin. Each layer 102, 104 is formed from a plurality of fibers 106. In FIGS. 1A and 1B, the plurality of fibers 106 of layer 102 are oriented in a first direction and the plurality of fibers 106 are oriented in a second direction that is perpendicular to the first direction. In other aspects, the orientation of layers 102, 104 may be set as desired for a particular application. Fibers 106 may be any of a variety of fiber types, including glass fibers, carbon fibers, aramid fibers, basalt fibers, and the like.

Layers 102, 104 are joined together by a resin that is placed between layers 102, 104. The resin may be, for example, a thermoplastic or thermoset resin matrix. In some aspects, composite prepreg 100 is assembled by applying resin to layer 104 and then laying layer 102 on top of the resin. In some aspects, rollers are used to press layers 102, 104 together. The plurality of fibers 106 of layers 102, 104 absorb some of the resin to bond layers 102, 104 together to form composite prepreg 100.

Composite prepreg 100 is used to create a variety of different components by a process known as layup. The layup process comprises stacking layers of composite prepreg 100 to form the desired component. In some aspects, composite prepregs 100 are cut to shape and placed into tools or molds to form the desired shape. The surfaces of composite prepreg 100 have a stickiness or tackiness that facilitates the placement and positioning of composite prepreg 100 into tool. For example, the tackiness helps each piece of composite prepreg 100 stay in place until all layers of composite prepreg 100 have been placed into the tool. After the desired component has been formed by building up layers of composite prepreg 100, the component is then cured. Curing may be done at room temperature or in an oven. Using the layup process to build components from composites is a well-known process and will not be discussed in more detail.

In some instances, it has been noticed that the degree of tackiness of composite prepregs, such as composite prepreg 100, varies. In practice, if a component is manufactured from composite prepregs having insufficient tackiness, the quality of the component can be negatively affected. For example, the layers of the composite prepreg may contain defects (e.g., unbonded layers, voids, and the like). The cause for the variance in tackiness is not completely understood, but it is believed that the variance is caused at least in part by variances in the ambient conditions that the composite prepregs experience during manufacture. For example, the layers of fibers may be manufactured in one factory and then shipped off to a second location to be combined with resin to form the composite prepreg. The composite prepreg is then transported to an end-user who uses the composite prepreg to create an end product. While the cause of variance in tackiness is currently unknown, this disclosure is directed to methods of quantifying tackiness of composite prepregs so that composite prepregs having inadequate tackiness can be rejected to ensure the quality and strength of the components made from the prepregs.

Figure 2B:
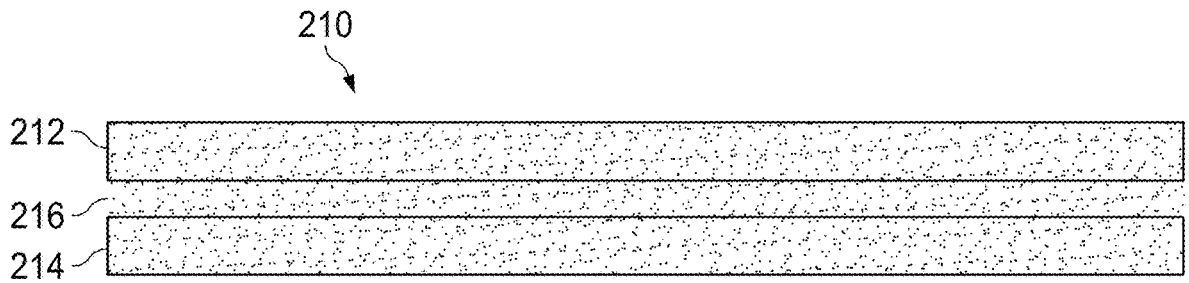

FIGS. 2A and 2B are schematic illustrations of a side view of composite prepregs 200, 210, respectively. Composite prepreg 200 includes layers 202, 204 and resin 206. Composite prepreg 210 includes layers 212, 214 and resin 216. Similar to layers 102, 104, layers 202, 204 are comprised of strands of parallel fibers and are oriented so that the fibers of layer 202 are perpendicular to the fibers of layer 204. FIG. 2A illustrates composite prepreg 200 having a desirable level of tackiness. It has been determined that tackiness is optimal when resin 206 fills the space between layers 202, 204 and only partially permeates into each of layers 202, 204. FIG. 2B illustrates composite prepreg 210 having an undesirable tackiness. It has been determined that tackiness is compromised when resin 206 fills the space between layers 202, 204 and more completely permeates layers 202, 204.

Figure 3:
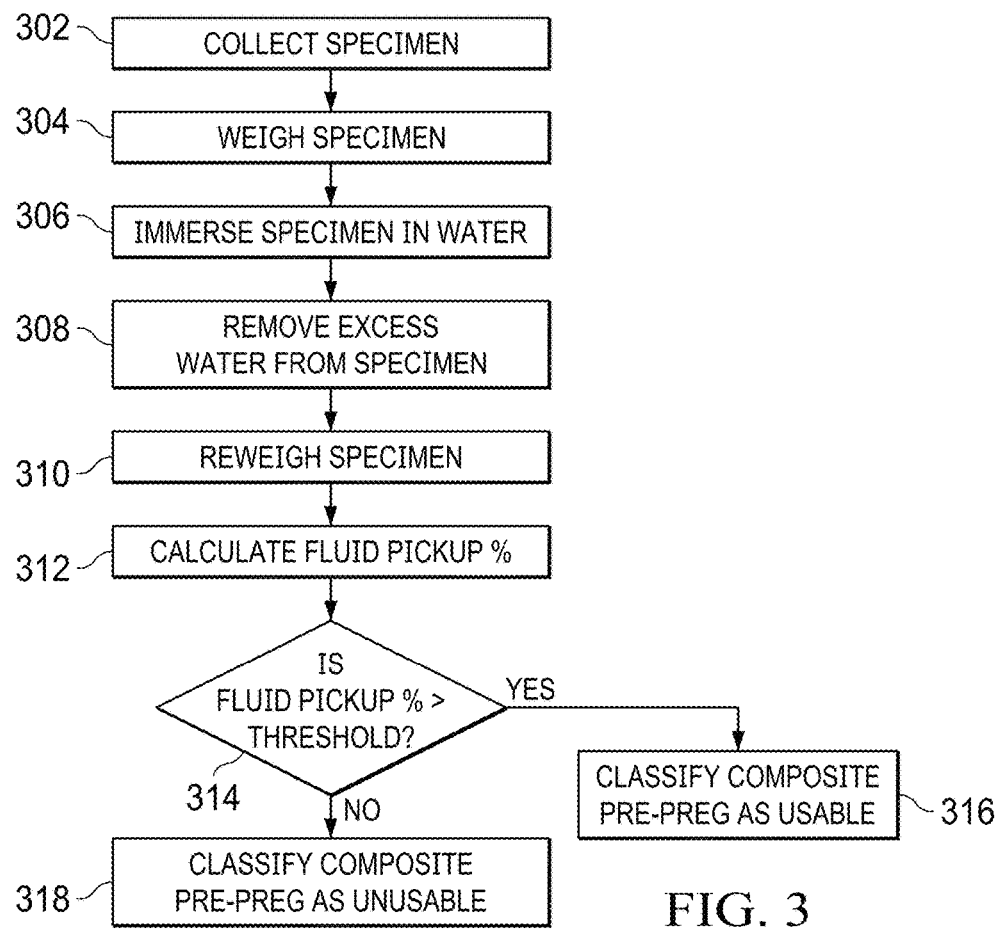
FIG. 3 illustrates a method of testing a composite prepreg, according to aspects of the disclosure.

FIG. 3 illustrates a method 300 for quantifying the tackiness of a composite prepreg. Method 300 begins at step 302. In step 302, specimens of composite prepreg are collected for testing. For example, composite prepreg is often purchased in bulk (e.g., by the roll). To quantify the tackiness of the bulk composite prepreg, one or more specimens of composite prepreg are collected from the bulk composite prepregs by cutting off a portion of the composite prepreg. In some aspects, each specimen is a 4 inch by 4 inch square. In some aspects, specimens are collected from a left edge of a bulk roll, a middle portion of the bulk roll, and/or a right edge of the bulk roll. Collecting specimens from multiple locations provides a more thorough analysis of the tackiness of the bulk roll. Composite prepregs often comprise a backing material that prevents the tackiness of the composite prepregs from sticking to itself while rolled up. The tackiness of the composite prepreg acts as an adhesive that facilitates the placement of layers of composite prepreg into a mold by holding the composite prepreg in place. If present, the backing material should be removed. After step 302, method 300 proceeds to step 304.

Figure 4:
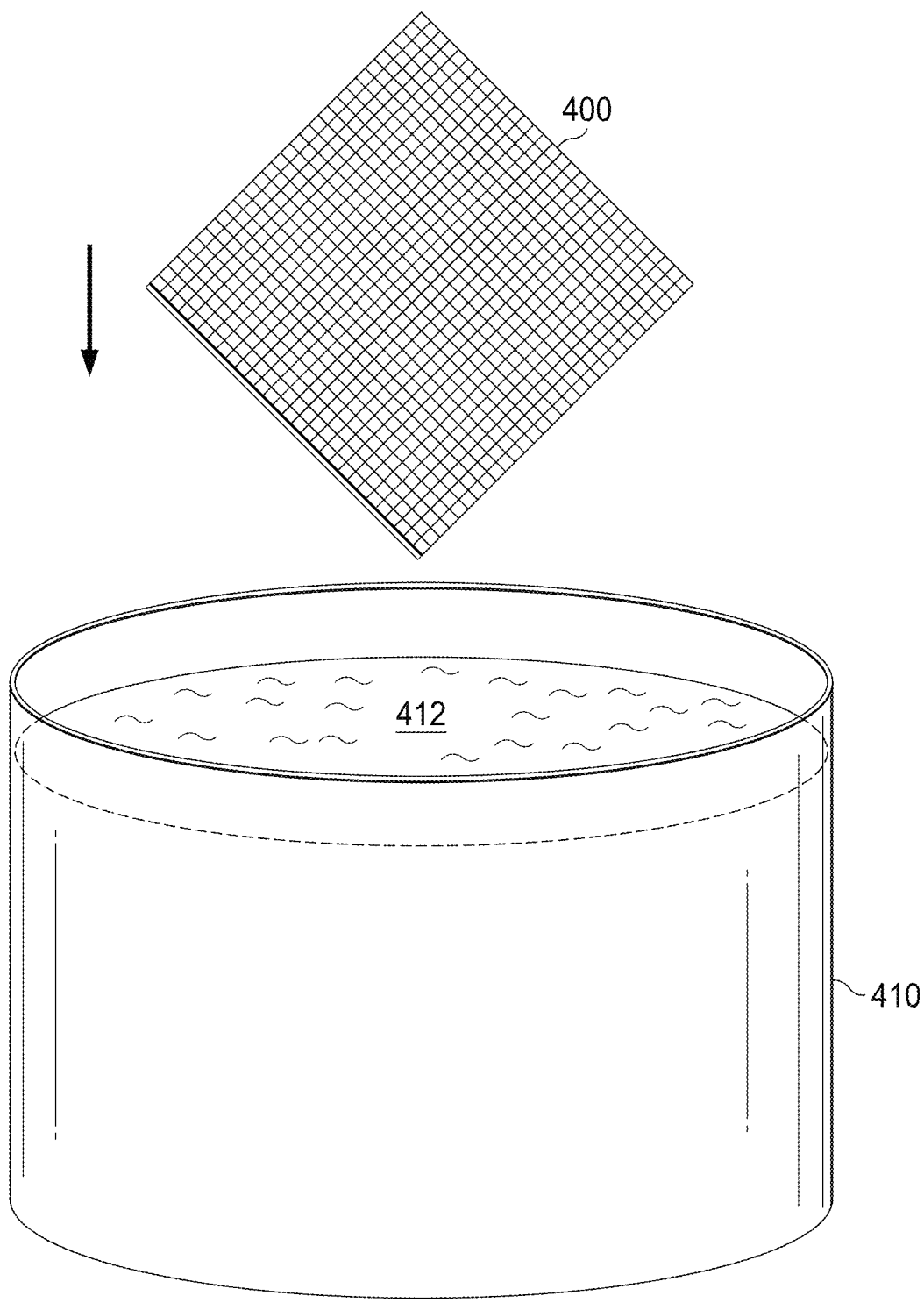
FIG. 4 illustrates a testing apparatus for determining an amount of surface resin present in a composite prepreg.

In step 304, the specimen is weighed to obtain a dry weight ($W_{DRY}$) of the specimen. Method 300 then proceeds to step 306. In step 306, the specimen is immersed in a fluid bath. FIG. 4 illustrates a specimen 400 prior to being lowered into a container 410 containing a fluid 412. Fluid 412 may be water or other another fluid. In some aspects, fluid 412 is deionized water having a pH of between about 6.7 and 7.0. In some aspects, fluid 412 may be standard tap water. In some aspects, fluid 412 may be any fluid that does not degrade (e.g., dissolve or deteriorate) specimen 400.

Specimen 400 is a four inch by four inch portion of a composite prepreg (e.g., composite prepreg 100). In other aspects, specimen 400 may comprise other shapes and/or dimensions. Specimen 400 is slowly lowered into the fluid bath. As shown in FIG. 4, specimen 400 is oriented with the fibers arranged at +/−45° relative to the surface of the fluid in the fluid bath. In other aspects, specimen 400 may be oriented so that the fibers of specimen 400 are at any angle between 0° and 90°. In some aspects, the specimen is lowered into the fluid bath at a rate of between 0.5 cm/s and 1.5 cm/s. Lowering the specimen into the fluid at this slow rate and with the fibers oriented as shown in FIG. 4 assists with the uptake of fluid by the specimen. Once the specimen is submerged, the specimen is left in the fluid bath to soak. In some aspects, the specimen is allowed to soak in the fluid bath for 25-30 minutes. In other aspects, the specimen may soak for less than 25 minutes or more than 30 minutes. After step 306, method 300 proceeds to step 308.

In step 308, the specimen is removed from the fluid bath and excess fluid is removed. Excess fluid may be removed by gentle shaking, blotting with a paper towel, and the like. In some aspects, the specimen may be gently squeegeed using an aluminum plate wrapped in a paper towel or the like. In general, the excess fluid to be removed from the specimen is any surface fluid that has not been absorbed by the specimen. After step 308, method 300 proceeds to step 310.

In step 310, the specimen is weighed to obtain a wet weight ($W_{Wet}$) of the specimen. After step 310, method 300 proceeds to step 312. In step 312, the tackiness of the specimen is determined by calculating a fluid pickup percentage of the specimen. The fluid pickup percentage is determined using the following equation:

$$\text{Fluid Pickup \%} = \left(\frac{W_{Wet} - W_{Dry}}{W_{Dry}}\right) \times 100 \qquad \text{Equation 1}$$

Figure 5:
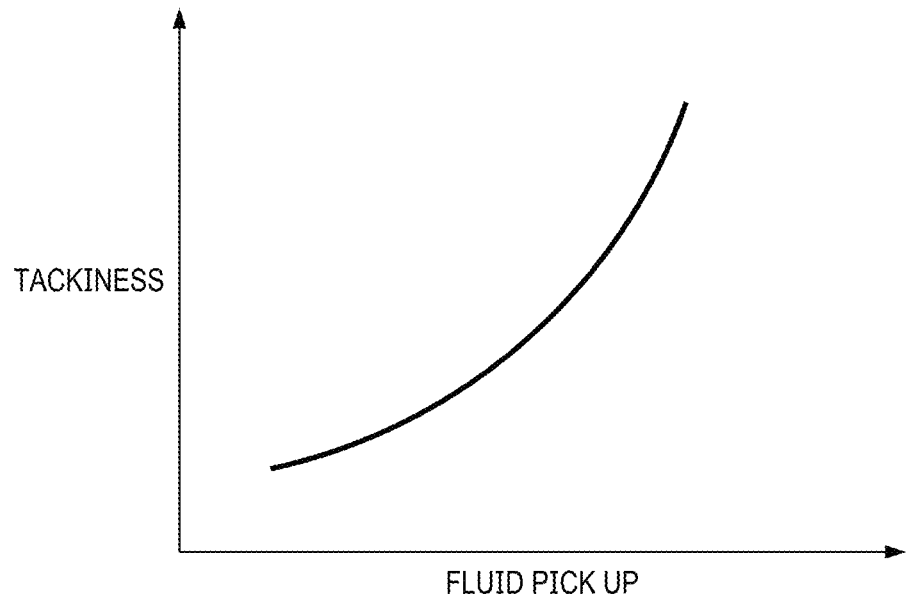
FIG. 5 is a graph illustrating the relationship of water pickup and tackiness.
Figure 6:
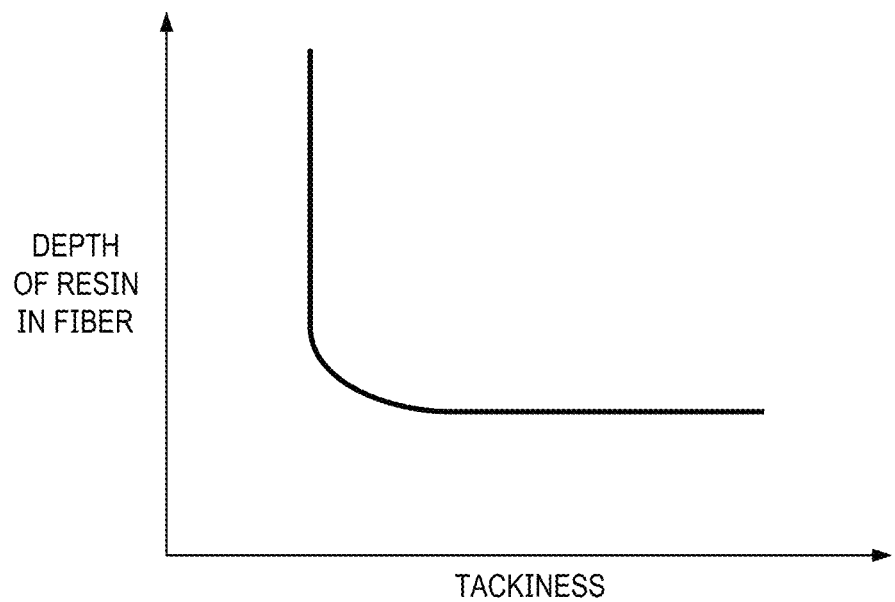
FIG. 6 is a graph illustrating the relationship of tackiness and depth of resin in the fibers of the prepeg.

After the fluid pickup percentage has been determined, method 300 proceeds to step 314. In step 314, a determination is made as to whether or not the specimen is usable or unusable by comparing the fluid pickup percentage to a predefined threshold value. As discussed relative to FIGS. 2A and 2B, the tackiness of the specimen is related to the amount of permeation of the resin into each layer of the composite prepreg. If the resin of the specimen of method 300 has not over-permeated into the layers of the composite prepreg (e.g., similar to FIG. 2A), the fibers of the layers will be more receptive to absorbing fluid from the fluid bath. If the resin of the specimen of method 300 has over-permeated into the layers of the composite prepreg (e.g., similar to FIG. 2B), the fibers of the layers will be less receptive to absorbing fluid from the fluid bath. The higher the absorption of fluid into the specimen, the higher the fluid pickup percentage value will be. The higher the fluid pickup percentage, the higher the tackiness of the composite prepreg. Through empirical testing, a predefined threshold value for the fluid pickup percentage is determined. FIG. 5 is a graph illustrating the relationship of water pickup and tackiness. In particular, FIG. 5 illustrates that higher water pickup indicates a higher level of tackiness. FIG. 6 is a graph illustrating the relationship of tackiness and depth of resin in the fibers of the prepeg. In particular, FIG. 6 illustrates that higher levels of tackiness tend to have less resin penetration. FIGS. 5 and 6 illustrate that higher fluid pickup is proportional to the amount of surface resin, indicating that the level of tackiness increases with higher values of fluid pickup.

If, in step 314 it is determined that the fluid pickup percentage is greater than the predefined threshold value, method 300 proceeds to step 316 and the composite prepreg from which the specimen was collected is classified as usable and is used for the manufacture of a component. If, in step 314, it is determined that the fluid pickup % is less than or equal to the predefined threshold value, method 300 proceeds to step 318 and the composite prepreg from which the specimen was collected is classified as unusable. In some aspects, the unusable composite prepreg may be unsuitable for use in some applications (e.g., where the component experiences higher loads), but may be suitable for use in other applications (e.g., where the components experiences lower loads). The value of the predefined threshold value can depend in part upon a particular use case of the composite prepreg, the types of fibers the composite prepreg uses, the type of resin used, and the like. In some aspects, the predefined threshold value may be about 4%.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of quantifying surface resin of a composite prepreg, the method comprising:
    collecting a first specimen from the composite prepreg;
    weighing, for a first time, the first specimen to obtain a dry weight of the first specimen;
    submerging the first specimen in a container containing a fluid;
    removing the first specimen from the container;
    weighing, for a second time, the first specimen to obtain a wet weight of the first specimen;
    calculating a fluid pickup percentage of the first specimen using the dry weight of the first specimen and the wet weight of the first specimen;
    comparing the fluid pickup percentage to a predefined threshold value;
    responsive to a determination that the fluid pickup percentage is greater than the predefined threshold value, classifying the composite prepreg as possessing sufficient tackiness for use; and
    responsive to a determination that the fluid pickup percentage is less than or equal to the predefined threshold value, classifying the composite prepreg as possessing insufficient tackiness for use.

2. The method of claim 1, comprising, if the fluid pickup percentage is greater than the predefined threshold value, using the composite prepreg to make a component.

3. The method of claim 1, comprising preparing a second specimen from the composite prepreg and performing the first weighing, the submerging, the removing, the second weighing, the calculating, and the comparing steps with the second specimen.

4. The method of claim 1, wherein the submerging comprises lowering the first specimen into the container at a rate of between 0.5 and 1.5 cm/s.

5. The method of claim 1, wherein the first specimen is submerged in the container for between 25 and 30 minutes.

6. The method of claim 1, wherein the submerging comprises lowering the first specimen into the container with fibers of a first layer of the first specimen being oriented normal to a surface of the fluid and fibers of a second layer of the first specimen being oriented parallel to a surface of the fluid.

7. The method of claim 1, wherein the fluid comprises water.

8. The method of claim 7, wherein the water is deionized water having a pH of between 6.7 and 7.0.

9. The method of claim 1, comprising, after removing the first specimen from the container and before the second weighing, removing excess fluid from the first specimen.

10. The method of claim 1, wherein the predefined threshold value is about 4%.

11. A method of manufacturing a component from a composite prepreg, the method comprising:
    collecting a specimen from the composite prepreg;

quantifying an amount of surface resin of the specimen by submerging the specimen in a container containing a fluid to determine a fluid pickup percentage;

responsive to a determination that the fluid pickup percentage exceeds a predefined threshold value, concluding that the composite prepreg possesses sufficient tackiness for use; and responsive to the concluding, forming a component from the composite prepreg.

12. The method of claim 11, comprising obtaining an additional specimen from the composite prepreg and performing the quantifying step with the additional specimen.

13. The method of claim 11, wherein the submerging comprises lowering the specimen into the container at a rate of between 0.5 and 1.5 cm/s.

14. The method of claim 11, wherein the specimen is submerged in the container for between 25 and 30 minutes.

15. The method of claim 11, wherein the submerging comprises lowering the specimen into the container with fibers of a first layer of the specimen being oriented normal to a surface of the fluid and fibers of a second layer of the specimen being oriented parallel to a surface of the fluid.

16. The method of claim 11, wherein the fluid comprises water.

17. The method of claim 16, wherein the water is deionized water having a pH of between 6.7 and 7.0.

18. The method of claim 11, wherein the predefined threshold value is about 4%.

\* \* \* \* \*